(No Model.)

T. H. CARLIN.
WHEEL.

No. 338,922. Patented Mar. 30, 1886.

Witnesses
Geo. W. Rea
M. C. Chaffee

Thomas H. Carlin
Inventor
by Connolly Bro. and McTighe

United States Patent Office.

THOMAS H. CARLIN, OF ALLEGHENY, PENNSYLVANIA, ASSIGNOR OF TWO-THIRDS TO WILLIAM J. CARLIN AND TO JAMES T. ARNOLD, TRUSTEE, BOTH OF SAME PLACE.

WHEEL.

SPECIFICATION forming part of Letters Patent No. 338,922, dated March 30, 1886.

Application filed December 15, 1884. Renewed November 25, 1885. Serial No. 183,950. (No model.)

*To all whom it may concern:*

Be it known that I, THOMAS H. CARLIN, of Allegheny, in the county of Allegheny and State of Pennsylvania, have invented certain new and useful Improvements in the Manufacture of Cast or Wrought Iron and Steel Wheels; and I do hereby declare that the following is a full, clear, and exact description of the invention, which will enable others skilled in the art to which it appertains to make and use the same, reference being had to the accompanying drawings, which form a part of this specification.

This invention relates to the manufacture of cast or wrought iron or steel wheels, rolls, or chasers on which a metal tire is used, and has for its object to provide a means of constructing the wheel and the tire by which the tire can be firmly attached to the wheel without the necessity of shrinkage, and when it is desirable for any reason to remove the tire it can be done and a new one put on with but little labor and loss of time. It also prevents the loosening of tires on account of extremes of heat and cold.

As the ordinary method of applying tires by shrinkage is so well known and its disadvantages so apparent, I shall not describe them here.

Figure 1:
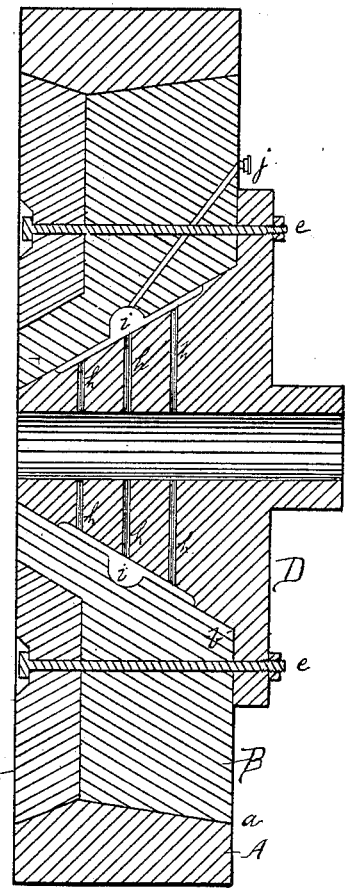
Figure 2:
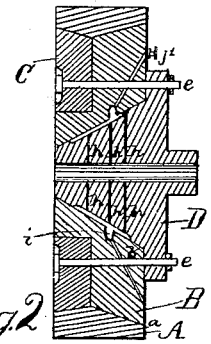

Referring to the accompanying drawings, Figure 1 shows a sectional view of a wheel constructed according to my method, having the tire and hub attached thereto; and Fig. 2, a similar view of a modification.

In constructing wheels according to my method, I make the cylindrical casting B of any desired diameter, and at its inner circumference of exact width of the wheel. The inner side of this casting forms an obtuse angle with the bottom of the lower face thereof, and the outside forms an acute angle with the same face, as shown at *a* and *b* in the drawings. About one-quarter way from the inner circumference of this casting I decrease the width thereof to a suitable width to admit of the casting C, having its circumference of a wedge-shape, being secured therein, thus forming a wheel with parallel faces and a V-shaped tread or rim.

The tire A is made of the ordinary construction, according to the use for which the wheel is designed to be put, and has its inner periphery of the same formation, but inverted, as the outer circumference of the wheel to which it is to be attached. The hub D is cast in a cone shape, to fit closely into the opening in the center of the wheel, and its inner face has a flange, *d*, extending a portion of the distance of the inner face of the wheel to permit the bolts *e e* to be drawn through it and bind the wheel together.

The method of securing the wheel together is as follows: The wheel or rim D is placed on the hub D, and the tire A is then placed outside the rim B. The cuneiform cylindrical piece *c* then being placed in position, the bolts *e e*, &c., are driven through suitable bolt-holes in castings B C D, and the wheel is firmly bound together by the nuts on the bolts.

It will be perceived that by reason of the peculiar formation of the outer circumference of the wheel and the corresponding shape of the inner periphery of the tire that it is securely and rigidly attached to the wheel without shrinkage or bolting through the tire, and that it cannot become loose or fall off through any ordinary usage.

When it is desirable to replace a broken or worn tire, the nuts are taken off the bolts and the bolts withdrawn, the piece C is loosened, and the tire removed, a new one being replaced in the same manner.

Suitable grooves and passages, as shown at *h* and *i*, may be cast in the hub and rim of the wheels, for the purpose of lubricating the axle or bearing of the hub.

Having described my invention, I claim—

1. In a metal wheel, the combination of hub D, wheel-body B, cuneiform ring *c*, and tire A, all constructed and arranged substantially as described.

2. In a metal wheel, the combination of wheel-body B, cuneiform ring *c*, and tire A, with a cone or wedge shaped hub D, said wheel being held together by bolts and nuts *e e*, substantially as described.

In testimony that I claim the foregoing as my own I have hereto affixed my signature in presence of two witnesses.

THOMAS H. CARLIN.

Witnesses:
J. G. BACKOFEN,
A. A. MOORE.